United States Patent [19]

Zahid

[11] 4,167,201

[45] Sep. 11, 1979

[54] PRESSURE ACCUMULATOR WITH FAILURE INDICATOR

[75] Inventor: Abduz Zahid, Los Angeles, Calif.

[73] Assignee: Greer Hydraulics, Inc., Chatsworth, Calif.

[21] Appl. No.: 892,958

[22] Filed: Apr. 3, 1978

[51] Int. Cl.$^{2}$ .............................................. F16L 55/02

[52] U.S. Cl. ....................................................... 138/30

[58] Field of Search ......................... 138/30; 220/85 B

[56] References Cited

U.S. PATENT DOCUMENTS 2,757,689 8/1956 Knox ...................................... 138/30

3,593,746 7/1971 Allewitz et al. ........................ 138/30

3,929,163 12/1975 Schön ..................................... 138/30

4,014,213 3/1977 Parquet .............................. 138/30 X

*Primary Examiner*—Charles E. Phillips

*Attorney, Agent, or Firm*—Arthur B. Colvin

[57] ABSTRACT

The present invention is directed to a pressure accumulator device and pertains more particularly to a pressure accumulator of the type incorporating a resilient, deformable bladder disposed within a rigid shell. The device is characterized by the incorporation therein of a sensor device adapted to provide early indication and/or automatic reaction to bladder failure.

1 Claim, 2 Drawing Figures

PRESSURE ACCUMULATOR WITH FAILURE INDICATOR

BACKGROUND OF THE INVENTION

1. Field of the Invention

The present invention lies in the field of hydraulic pressure accumulators.

2. The Prior Art

Pressure accumulators or dampeners are currently in widespread use in areas where energy storage and/or dampening of pulses in a hydraulic system are desired. As is well known, a form of accumulator includes a rigid pressure vessel, generally in the form of a cylinder having rounded upper and lower ends. In the upper end there is typically provided a gas charging port, the lower end having formed therein an oil port.

A resiliently distensible bladder member is suspended within the pressure vessel, dividing the same into two discrete chambers communicating, respectively, with the oil port and the gas charging port.

In use, the oil port is connected to a source of fluid under pressure, e.g. the hydraulic line emerging from a pump.

Gas under pressure is introduced into the other chamber. Where the pressure in the hydraulic line is less than the pressure in the gas chamber, the bladder is expanded and seals the oil port, a valve member being typically provided on the bladder to reduce wear on the bladder walls.

When the pressure in the line carrying the oil (or other liquid) exceeds the pressure in the bladder, the gas in the chamber communicating with the gas charging port is compressed and the valve is unseated, allowing the flow of liquid through the oil port into the interior of the pressure vessel.

Since pressure vessels comprise rigid metallic members, it is impossible to inspect the interior thereof to establish the condition of the bladder without disassembly of the accumulator apparatus.

While in some applications, malfunction of the accumulator, as resulting from rupture of the bladder for instance, may be readily detected by the sensing of changed operating conditions, in other situations, i.e. where a plurality of accumulators are used in a system as pulse dampeners, bladder failure of a given accumulator will not be evident. Moreover, accumulators are often located at positions remote from the control unit or area, i.e. at widely spaced intervals along an oil conduit, and determination of bladder failure requires an on-sight inspection of the device.

SUMMARY OF THE INVENTION

The present invention may be summarized as directed to an improved pressure accumulator device incorporating means for indicating bladder failure. In its broadest phase, the invention is directed to the provision of an accumulator wherein a liquid sensing device is operatively connected to the gas chamber of the accumulator. The sensing of liquids signifies failure of the bladder, such sensed failure being used to signal a control area, operate a by-pass valve, or perform any of a number of alternate functions.

In accordance with the invention, the sensor mechanism is located within the gas charging port, and particularly within a plug or insert which may also carry the gas charging valve. Preferably, there is interposed between the sensor and the gas chamber, a restricted flow passage, the sensor being disposed within an enlarged chamber whereby the likelihood of spurious triggering of the sensor, especially as by the sensing of a bubble or bubbles or foam, is substantially reduced.

Accordingly, it is an object of the invention to provide an improved pressure accumulator device which includes a sensor mechanism for the detection of bladder failure.

A further object of the invention is the provision of a device of the type described wherein the sensor mechanism is located and arranged within the gas charging valve component.

Still a further object of the invention is the provision of a device of the type described wherein the sensor mechanism employed is responsive to the sensing of liquid and is relatively insensitive to foam.

A further object of the invention is the provison of a pressure accumulator device incorporating a sensor as described wherein the sensor is so positioned as to reduce the possibility of spurious triggering.

To attain these objects and such further objects as may appear herein or be hereinafter pointed out, reference is made to the accompanying drawings, forming a part hereof, in which.

Figure 1:
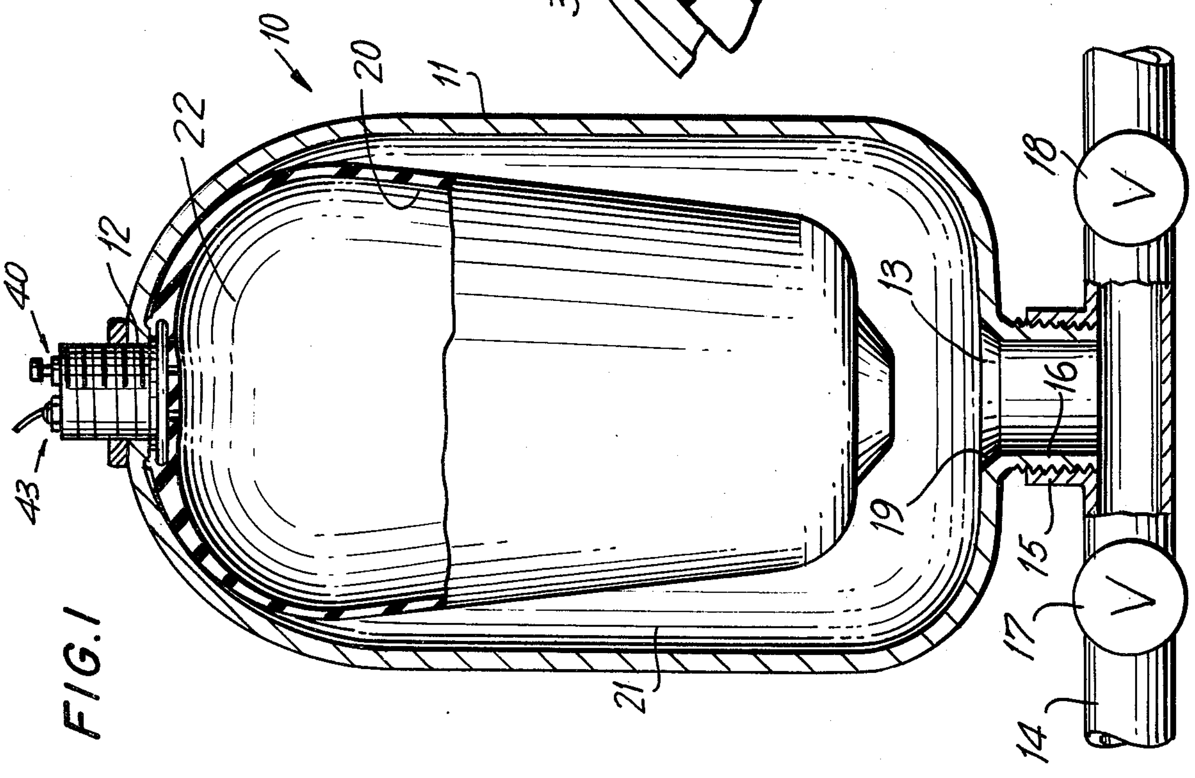
FIG. 1 is a vertical sectional view, partially diagrammatic, through an accumulator construction in accordance with the invention.

Turning now to the drawings, there is shown in FIG. 1 an accumulator assembly 10 including a pressure vessel 11 having a gas charging port 12 at one end, and an oil port 13 at the other. The port 13 may be connected to a conduit 14 carrying liquid under pressure, such as the output of a pump, etc. For this purpose there may be provided a T fitting 15 to which is threadedly connected a neck 16 depending from the pressure vessel below the oil port 13. A pair of valve members 17, 18 are interposed in the conduit 14 at opposite sides of the T fitting 15 to permit isolation of the accumulator device, if necessary. The oil port 13 includes the usual beveled valve seat 19.

A bladder member 20, formed of a distensible elastomeric material, such as neoprene, is disposed within the pressure vessel 11, dividing the same into two chambers, namely an oil chamber 21 in communication with the oil port 13, and a gas chamber 22 in communication with the gas charging port 12.

As is well known in the art, the bladder may be supported within the accumulator shell by any of a variety of supporting means so as to isolate the chambers 21, 22. In the illustrated embodiment, and without limitation, the bladder is supported by the air charging fitting or plug 23.

Figure 2:
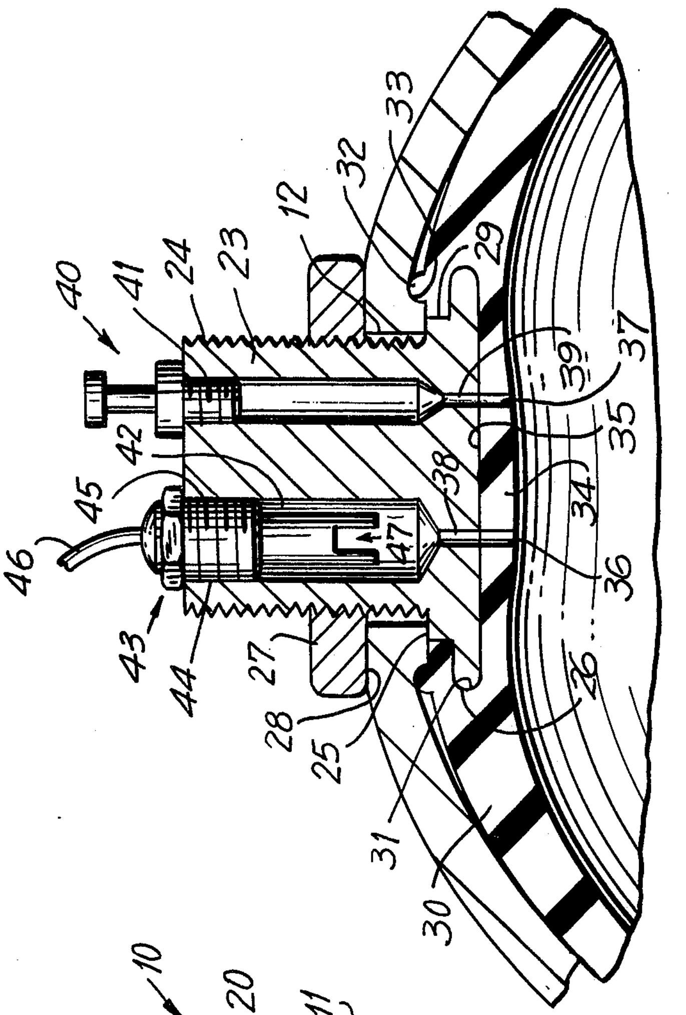
FIG. 2 is a magnified vertical sectional view taken on the line 2—2 of FIG. 1, and depicting the position of the sensor in the gas charging port assembly.

As may be readily perceived from an inspection of FIG. 2, the plug 23 comprises a threaded cylindrical shank portion 24 having an upwardly facing shoulder 25 and an annular radially outwardly extending flange 26. The plug member is retained in position by a threaded collar member 27 which engages the threaded shank portion 24 and clamps the shoulder 25 against the inner surface of the vessel surrounding the oil port 12, the collar member 27 being clamped against the annular surface 28 surrounding the outside of the gas port. One or more O-rings (not shown) may be interposed between the respective surfaces to prevent leakage.

The flange 26 may provide an anchoring and retaining means for the mouth portion 29 of the bladder 20. For such purpose the bladder 20 includes a thickened portion 30 having an annular recess 31 within which the flange 26 fits.

The bladder member may include an annular, upwardly directed lip 32 biased against outwardly facing shoulder 33 of the pressure vessel to effect the sealing and connection of the bladder about the gas charging port.

Optionally but preferably, the bladder includes an upper web portion 34 which lies against the downwardly facing surface 35 of the plug 23. The web 34 includes two through-going apertures 36, 37, which apertures are aligned with restricted flow passages 38, 39, respectively in the plug 23.

A gas charging valve 40 is mounted in bore portion 41 communicating with restricted flow passage 39, the valve being a Schrader or like known one way valve which permits gas under pressure to be introduced into the chamber 22 but precludes retro-flow of the gas outwardly through the valve.

The plug 23 includes a second cylindrical bore 42, the axis of the bore 42 being aligned parallel with the major axis of the pressure vessel 11. The bore 42 communicates with the restricted flow passage 38 but is of substantially greater cross sectional area than said flow passage.

A liquid sensing member 43 is mounted in the bore 42, as by threaded engagement between shank 44 of the sensor and a complementally threaded portion 45 in the bore.

Preferably the sensor is of the ultra sonic type, suitable sensors being manufactured by the National Sonics Corporation, 250 Marcus Boulevard, Happauge, New York. A suitable form of such sensor is identified and described in Bulletin 101-F of the named organization. Various suitable ultra sonic sensors are available from the noted organization. By way of illustration and without limitation, Model 310-S has been found suitable. The sensors which, as noted, are known per se, have the property of sensing the presence of liquids and are able to distinguish between liquid and bubbles or a foam.

While it is considered that other liquid sensors than those operating on the ultra sonic principle are suitable for use in the instant application, the ultra sonic type of sensor is considered to be the best mode presently known.

The sensor includes a conductor 46 which may be connected to a relay or like device to close a circuit, operate a valve, e.g. valves 17, 18, or perform such other function as may be desired, responsive to energization.

The provision of a reduced size or restricted passage 38, together with an enlarged bore 42 housing the sensor 44 further reduces the possibility of a spurious activation of the sensor. This desirable result inheres in the tendency of the reduced passage to condense or liquefy any froth or foam travelling in the direction of the bore 42. Such spurious operation could result from the minor amounts of condensate or the like occasionally present in the bladder being turned into a froth and driven from the chamber 21 into the bore 42 in the event of violent or sudden pressure changes.

The normal operation of the device has already been described.

In the event of rupture of the bladder, fluid will flow through the bladder and be driven under pressure through the aligned aperture 36 in the bladder, passage 38 in the plug, and into the bore 42. When the fluid enters into the space defining the sensing gap 47 of the sensor, a signal will be emitted which may be used to perform some control or indicating function.

It will be readily recognized in the light of the foregoing description that skilled workers in the art may devise or develop variations and modifications utilizing the underlying principles disclosed. Accordingly, the invention is to be broadly construed within the scope of the appended claims.

Having thus described the invention and illustrated its use, what is claimed as new and is desired to be secured by Letters Patent is:

1. An accumulator device comprising, in combination, a pressure resistant shell having an oil port at one end and a gas charging port at the other end, a resilient, distensible bladder member supported in said shell including a mouth surrounding said gas charging port, said bladder dividing the interior of said shell into first and second chambers, respectively communicating with said oil and said gas ports, a plug member mounted in said gas charging port, said plug member including a laterally directed flange portion, said mouth of said bladder surrounding said flange portion and being clampingly urged by said flange against inner surface portions of said shell surrounding said gas charging port, said plug member having a bore portion substantially axially aligned with the major axis of said shell, the diameter of said bore portion being substantially greater at its outer end than at its inner end, said inner end defining a restricted flow passage into said second chamber, said plug member including a gas charging valve mounted in said plug member and communicating with said second chamber, and liquid sensing means mounted in the outer end of said bore portion and communicating with said second chamber for sensing the ingress of liquid into said second chamber, said bladder including first and second apertures respectively communicating through said gas valve and restricted flow passage with said second chamber.

* * * * *